C. G. Lathrop.
Cultivator.
No. 63,534. Patented Apr. 2, 1867.

WITNESSES:
Theo. Tusche.
W.m Truss.

INVENTOR:
C. G. Lathrop.
Per Munn & Co.
Attorneys.

United States Patent Office.

C. G. LATHROP, OF SAN JOSE, CALIFORNIA.

Letters Patent No. 63,534, dated April 2, 1867.

---

IMPROVEMENT IN WEED-CUTTER.

---

The Schedule referred to in these Letters Patent and making part of the same.

---

TO ALL WHOM IT MAY CONCERN:

Be it known that I, C. G. LATHROP, of San José, Santa Clara county, California, have invented a new and improved Weed Cutter; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
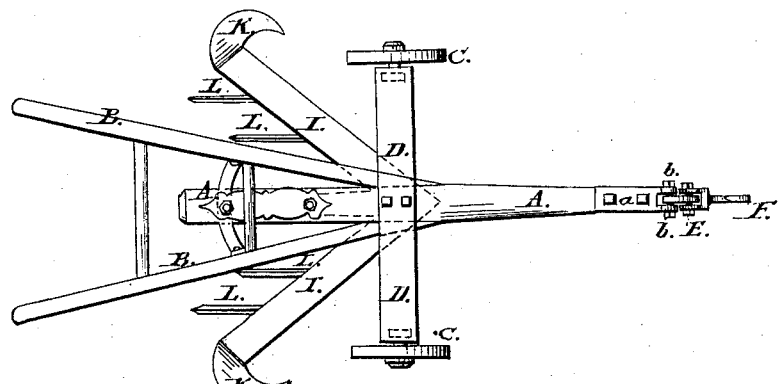
Figure 1 is a plan or top view of my improved weed cutter.
Figure 2:
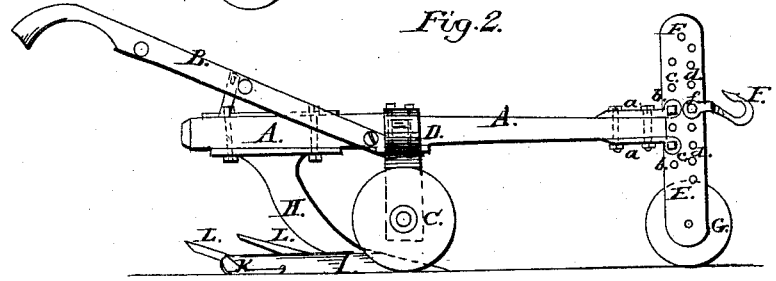
Figure 2 is a side elevation of the same.
Figure 3:
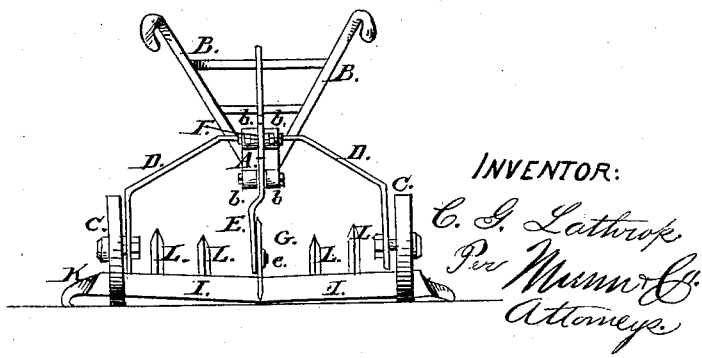
Figure 3 is an end elevation of the same.

This invention relates to an apparatus for reducing manual labor in eradicating weeds, and also completely destroying the latter.

It consists chiefly in the use of a V-shaped horizontal cutter, which is secured to a standard that is secured to the under side of a common plough beam, the latter being supported by two or more wheels. The point of the cutter is forward, and in the centre of the machine, and the wings extend to the rear and sides, so as to cut the weeds and grass in a strip of ground that is at least as wide as the supporting-wheels are apart from each other. At the outer ends of the cutter are attached hook-shaped knives, that prevent any weeds from sliding off the ends of the cutter, and thus insure their destruction. At the front of the plough beam is attached an adjustable circular revolving colter, which also serves to support the beam, and to steady the motion of the whole apparatus. The colter, as well as the supporting-wheels, is adjustable up and down, so as to vary the depth of the cutter in the ground. The draught-hook is also adjustable up and down, on the front end of the plough beam, for the same purpose.

A represents a plough beam, of usual construction and shape. It is provided with handles, B B, projecting beyond its rear end in the usual manner. It is supported by two wheels, C, which are attached to the ends of a cross-beam, D, in such a manner that they can be adjusted up and down. At the front end of the beam A are arranged two metal plates, $a\ a$, one on the upper the other on the lower surface of the beam. The front end of each of these plates is provided with ears, $b\ b$, through which bolts are passed for holding a vertical standard, E. The standard is provided with a row of holes, $c$, so as to be adjustable up and down in its supports. The draught-hook F is pivoted to the standards E by a bolt, $f$, which is passed through one of a row of holes, $d$, provided in the standard E, on which the hook can be adjusted. To the lower end of the standard E is arranged a pin, $e$, on which a circular cutter, G, is mounted, so as to revolve as the plough is drawn forward, and to act as a colter for the cutter in its rear, and also to support the front end of the plough beam, and to steady the motion of the machine. To the under side of the plough beam A is secured, in any suitable manner, a standard, H, to the lower end of which a V-shaped horizontal cutter, I, is secured, the point of which is forward and in line with the colter G. The cutter I can be made of two or more pieces, as desired. To its ends are attached knives, K, which are turned forward, so as to destroy and cut all the weeds that would otherwise slide off the ends of the cutter. To the rear of the cutter I is arranged a series of vertical knives, L L, for the purpose of cutting the weeds, and preventing their being arranged in two broad strips, and thus prepare the land for the harrow.

Having thus described my invention, what I claim as new, and desire to secure by Letters Patent, is—

1. A weed-cutter, made and operating substantially as herein shown and described.

2. The V-shaped horizontal cutter I, provided with knives, K, at its ends, substantially as and for the purposes herein shown and described.

3. The circular revolving colter G, arranged in front of the plough beam, in combination with the cutters I and K, all made and operating substantially as herein shown and described.

4. The adjustable draught attachment E and F, in combination with the cutters G, I, and K, as set forth.

5. A weed-cutter, so constructed that either the knives or the wheels on which the whole device is supported can be adjusted up and down, so that the cutters can be brought more or less into the ground.

C. G. LATHROP.

Witnesses:
WM. F. McNAMARA,
ALEX. F. ROBERTS.